US008374214B2

(12) United States Patent
Roh et al.

(10) Patent No.: US 8,374,214 B2
(45) Date of Patent: Feb. 12, 2013

(54) FREQUENCY-HOPPING SCHEME

(75) Inventors: June Chul Roh, Allen, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 389 days.

(21) Appl. No.: 12/759,684

(22) Filed: Apr. 13, 2010

(65) Prior Publication Data

US 2010/0260232 A1 Oct. 14, 2010

Related U.S. Application Data

(60) Provisional application No. 61/168,800, filed on Apr. 13, 2009.

(51) Int. Cl.
*H04B 1/00* (2006.01)

(52) U.S. Cl. ......... 375/133; 375/131; 375/132; 375/130

(58) Field of Classification Search .................. 375/133
See application file for complete search history.

(56) References Cited

U.S. PATENT DOCUMENTS 5,373,503 A * 12/1994 Chen ............................ 370/346
6,011,786 A * 1/2000 Dent ............................ 370/330
6,674,789 B1 * 1/2004 Fardoun et al. .............. 375/132
6,954,470 B2 10/2005 Paneth et al.
7,079,568 B1 * 7/2006 Boetzel et al. ................ 375/132
7,230,971 B1 * 6/2007 Beard .......................... 375/132
7,376,394 B2 * 5/2008 Liu ............................. 455/63.1
7,555,031 B2 6/2009 Chan et al.
2002/0021745 A1 * 2/2002 Negus .......................... 375/132
2005/0058181 A1 * 3/2005 Lyle et al. .................... 375/133
2005/0100076 A1 5/2005 Gazdzinski et al.
2006/0141947 A1 * 6/2006 Samuelsson .................... 455/95
2006/0198426 A1 * 9/2006 Partyka ......................... 375/133
2007/0116093 A1 * 5/2007 Karlsson ....................... 375/130
2009/0097531 A1 * 4/2009 Franceschini et al. ........ 375/133
2009/0311972 A1 * 12/2009 Husted et al. .................. 455/76
2009/0311979 A1 * 12/2009 Husted et al. ................ 455/102
2010/0189032 A1 * 7/2010 Chen et al. .................... 370/328
2011/0150042 A1 * 6/2011 Liu .............................. 375/133

OTHER PUBLICATIONS

Linear congruential generator, Found at: http://en.wikipedia.org/wiki/Linear_congruential_generator.

* cited by examiner

*Primary Examiner* — Daniel Washburn
*Assistant Examiner* — Santiago Garcia
(74) *Attorney, Agent, or Firm* — Steven A. Shaw; W. James Brady; Frederick J. Telecky, Jr.

(57) ABSTRACT

A method comprises generating, by logic, a random number. The method also comprises determining a next frequency in said sequence using the random number and one or more of a minimum separation, a channel number, and a number of channels. The method further comprises hopping to the next frequency.

16 Claims, 4 Drawing Sheets

FREQUENCY-HOPPING SCHEME

CROSS-REFERENCE TO RELATED APPLICATION

The present application claims priority to U.S. Provisional Patent Application No. 61/168,800, filed on Apr. 13, 2009, which is hereby incorporated herein by reference.

BACKGROUND

Wireless devices in a network communicate with each other by sending and receiving data on particular center frequencies. For example, one device in a wireless network may wirelessly send data using a specific center frequency to another device on the network, which receives the data using that same center frequency.

In some cases, it is advantageous to repeatedly change the center frequency that multiple wireless devices use to communicate with each other (e.g., to avoid extended use of frequencies that provide poor signal quality). Such adjusting is known as "frequency hopping," because the devices "hop" from one frequency to another. The precise manner in which wireless devices perform frequency hops may confer various advantages.

SUMMARY

The problems noted above are solved in part or whole by a method of producing a frequency hopping sequence. The method comprises generating, by logic, a random number. The method also comprises determining a next frequency in said sequence using the random number and one or more of a minimum separation, a channel number, and a number of channels. The method further comprises hopping to the next frequency.

The problems noted above also are solved in part or whole by a method that comprises sending or receiving data using a center frequency associated with a first channel number. The method also comprises determining a second channel number. The second channel number is at least a predetermined number of channels (or frequencies) away from the first channel number, and the determination of the second channel number is in accordance with a uniform distribution scheme over a set of possible channel numbers (or, equivalently, center frequencies). The method further comprises hopping from the center frequency associated with the first channel number to another center frequency associated with the second channel number. The method finally comprises sending or receiving data using the another center frequency associated with the second channel number.

The problems noted above also are solved in part or whole by a system that comprises logic and communication logic coupled to the logic. The logic causes the communication logic to hop among multiple center frequencies and further causes the communication logic to transmit or receive data using the multiple center frequencies. With each hop, the logic selects a target center frequency that is separated from a previous center frequency by at least a minimum separation.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
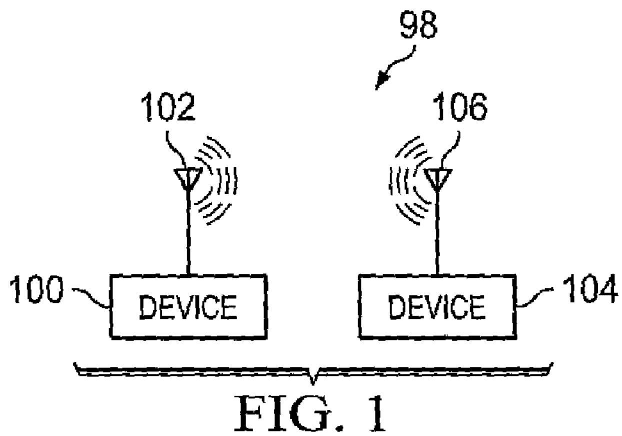
FIG. 1 shows a block diagram of an illustrative system implementing the frequency hopping scheme described herein, in accordance with embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "or" is used in the inclusive sense and not in the exclusive sense. Thus, the phrase "A or B" includes the possibilities of A and not B; B and not A; and both A and B. In the frequency-hopping context, if a wireless device hops from frequency X to frequency Y, the term "previous frequency" or "previous center frequency" refers to frequency X and the term "target frequency" or "target center frequency" refers to frequency Y.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some cases, wireless devices communicating on a particular center frequency may benefit from hopping to another center frequency at least in part because the frequency on which they are communicating has experienced some measure of channel degradation (e.g., deep fades in narrowband applications) or interference from another, different wireless technology. Merely hopping to a neighboring frequency is often of no benefit, however, because the aforementioned degradation may encompass the current frequency as well as neighboring frequencies. The current frequency and the negatively impacted, neighboring frequencies are collectively encompassed within what is called a "coherence bandwidth."

Accordingly, disclosed herein are systems and methods for implementing a novel frequency-hopping scheme to achieve frequency diversity by guaranteeing a minimum center frequency separation between consecutive hops. The frequency-hopping scheme ensures that each frequency hop meets or exceeds a minimum separation so that the previous center frequency and frequencies neighboring the previous center frequency are avoided (i.e., the minimum separation meets and/or exceeds the coherence bandwidth and/or some fraction of the coherence bandwidth). The scheme also ensures that each center frequency in a set of possible target center frequencies has a similar or equal chance of being selected as the target center frequency. In this way, the frequency-hopping wireless devices become more "friendly" to other wireless devices operating in the same frequency band. For instance, communications between two non-frequency-hopping wireless devices that communicate with each other at a center frequency of X may suffer if the frequency-hopping devices excessively hop to center frequency X. Therefore, ensuring that the frequency-hopping devices hop to center frequency X no more often than they hop to other frequencies mitigates deleterious effects on communications between the two non-frequency-hopping devices. At least some, if not all, of the embodiments disclosed herein are compatible with the IEEE 802.15.6 protocol, which is hereby incorporated herein by reference.

FIG. 1 shows an illustrative block diagram of a system 98 implementing the frequency-hopping scheme described herein. The system 98 comprises devices 100 and 104. Both of the devices 100 and 104 are wireless in the sense that they communicate with each other (and, possibly, with other such devices) by transmitting and receiving signals using radio frequency (RF) communication techniques or other, similar techniques. The device 100 comprises an antenna 102 and the device 104 comprises an antenna 106. The antennas 102 and 106 facilitate wireless communication between the devices 100 and 104. The device 100 may comprise any suitable wireless communication device (e.g., network hub, mobile phone, personal digital assistant, computer, etc.). Similarly, the device 104 may comprise any suitable wireless communication device (e.g., network hub, mobile phone, personal digital assistant, computer, etc.).

Figure 2:
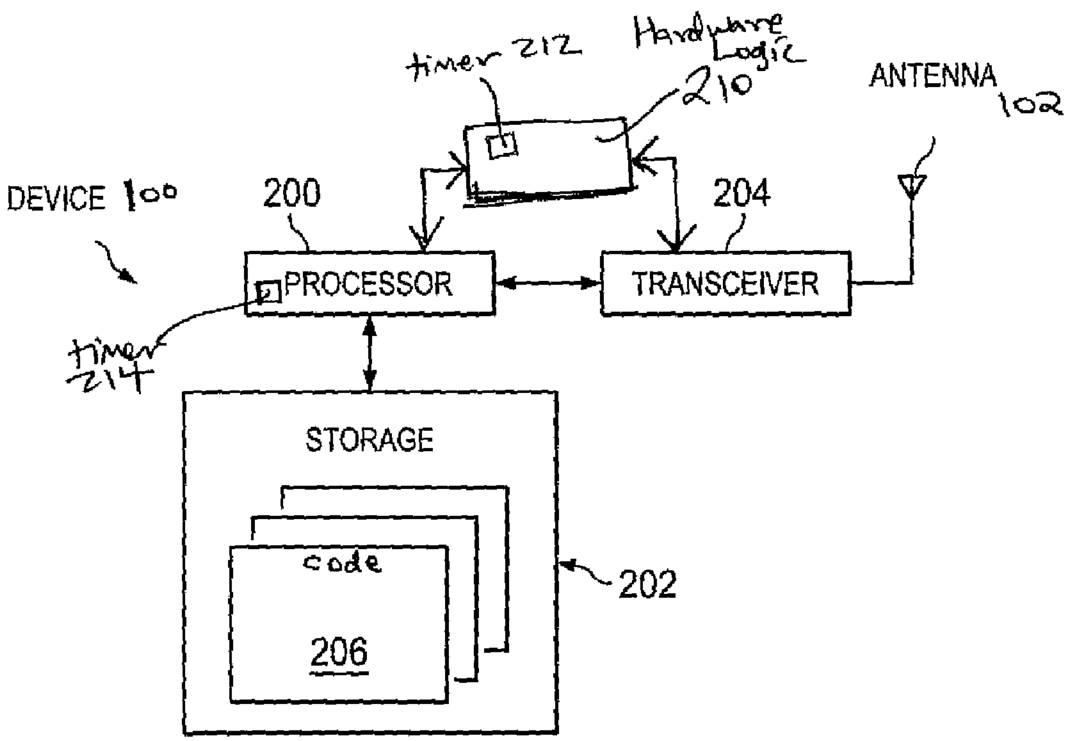
FIG. 2 shows a block diagram of an illustrative device included within the system of FIG. 1, in accordance with embodiments.

FIG. 2 shows an illustrative block diagram of the contents of the device 100 of FIG. 1. Some or all of the components shown in FIG. 2 as being part of device 100 also may be found within the device 104 of FIG. 1. The device 100 comprises a processor 200, storage 202 (e.g., hard drive, random access memory (RAM), read only memory (ROM), or some combination thereof), a transceiver 204, and an antenna 102. The storage 202 may comprise various types of software and/or firmware, herein collectively described as executable code 206. In some embodiments, when executed by the processor 200, the executable code 206 causes the processor 200 to perform at least some of the actions described herein. In some embodiments, hardware logic 210 (e.g., an application-specific integrated circuit) may perform at least some of the actions described herein. The hardware logic 210 may couple to the processor 200, the transceiver 204, or both. For simplicity, the term "logic" is used herein to refer to the processor 200 (including code executable by the processor 200) or the hardware logic 210 or a combination of the processor 200 and the hardware logic 210.

The transceiver 204 (or, more generally, "communication logic") transmits and receives data via the antenna 102. Generally, the transceiver 204 is set to a particular center frequency such that the transceiver 204 transmits data using that center frequency and/or receives data using that center frequency. The center frequency may be used for Time Division Duplex (TDD) mode operation and for Frequency Division Duplex (FDD) mode operation. During TDD mode, the transceiver 204 transmits or receives data on the center frequency, but does not do both at the same time. In FDD mode, the transceiver 204 may both transmit on one center frequency and receive data on another center frequency simultaneously (typically, the two center frequencies are separated by a constant frequency in Hz). The particular center frequency to which the transceiver 204 is set at any given time may change and is determined solely or in part by the logic. In some embodiments, the logic may repeatedly change center frequencies in accordance with a frequency-hopping scheme such as that described herein.

Figure 3:
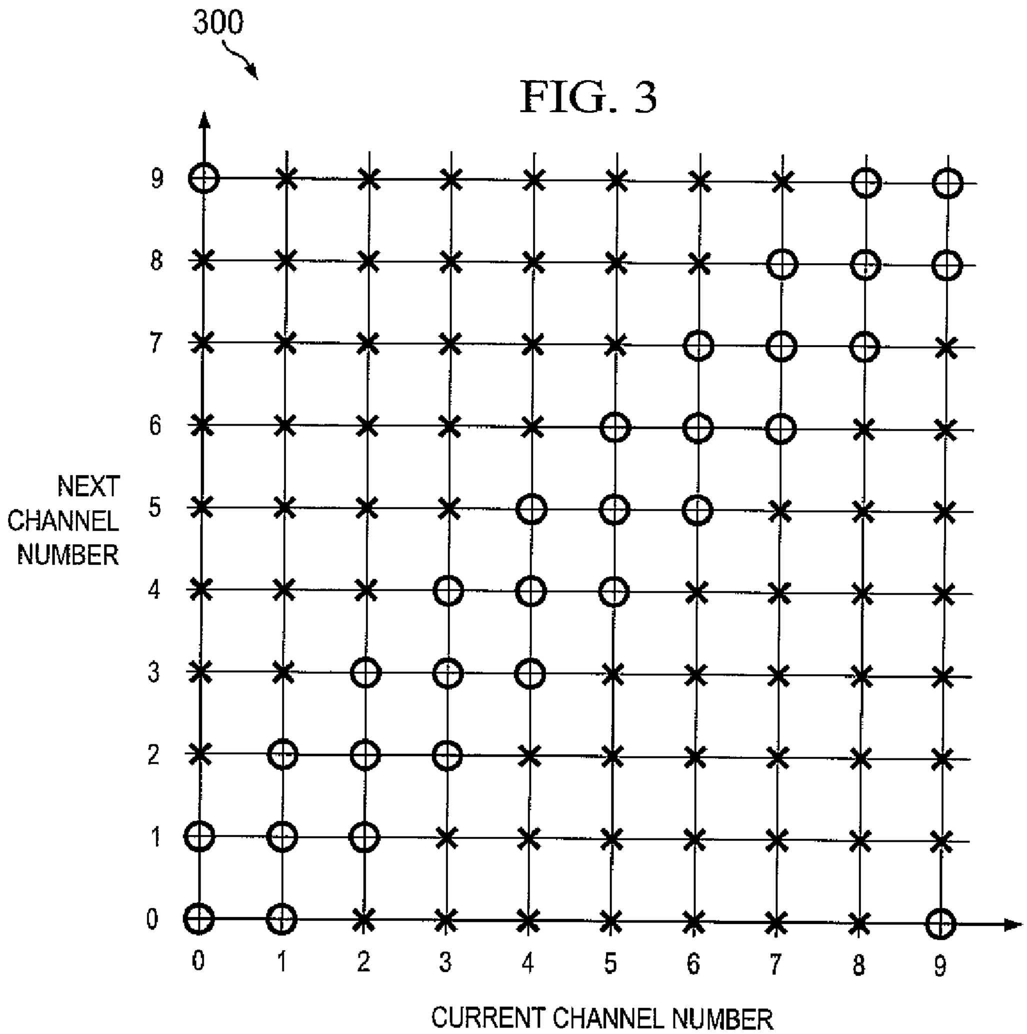
FIG. 3 shows a diagram illustrating an aspect of the frequency hopping scheme, in accordance with embodiments.

FIG. 3 shows a diagram 300 illustrating aspects of the novel frequency-hopping scheme described herein. In particular, the scheme dictates that when the transceiver 204 hops from a current center frequency to a new, target center frequency, the logic selects a target center frequency that is sufficiently removed from the current center frequency so as to avoid any undesirable channel deterioration that may have affected the current frequency as well as other frequencies neighboring the current frequency. For example, assuming the current center frequency is 900 MHz, channel degradation may affect not only the channel associated with 900 MHz but also may affect neighboring channels with nearby frequencies like 890 MHz-899 MHz and 901 MHz-910 MHz. The frequency range 890 MHz-910 MHz is the coherence bandwidth. Thus, in hopping from the current center frequency of 900 MHz to a new, target center frequency, the logic should select a target frequency that is less than 890 MHz or greater than 910 MHz. The difference between the current center frequency and a desirable target center frequency that is closest to the current center frequency is referred to as the "minimum separation." The minimum separation should meet or exceed the coherence bandwidth or some fraction of the coherence bandwidth.

In the example provided above, the minimum separation is 10 MHz. Minimum separations may be expressed as frequencies or, equivalently, as a specific number of channels, etc. Minimum separations (and other parameters) may be expressed in terms of frequencies and/or channel numbers and/or numbers of channels because, in at least some embodiments, frequencies are determined based on channel numbers. More specifically, in at least some embodiments, a particular center frequency is the sum of a corresponding channel number and some constant value (e.g., 2402 in the 2400 MHz band). For example, the center frequency may be equal to the channel number (which ranges from, e.g., 0 to 78) plus some constant, such as 2402, with a conversion of units to MHz or some other frequency-based unit.

The diagram 300 has an x-axis and a y-axis. The x-axis denotes the current channel numbers (and, equivalently, center frequencies) used by the transceiver 204 to transmit and/or receive data. The y-axis denotes the next channel numbers (and, thus, center frequencies) that the transceiver 204 might use to transmit and/or receive data. Thus, for example, for a particular current channel number on the x-axis that the transceiver 204 uses for data transmission and/or reception, the y-axis denotes the channel numbers to which the transceiver 204 may hop. The "X" marks on the diagram 300 denote channel numbers to which the transceiver 204 may hop, while the "O" marks on the diagram 300 denote channel numbers to which the transceiver 204 may not hop. The differentiating factor between channel numbers marked "X" (to which the transceiver 204 may hop) and channel numbers marked "O" (to which the transceiver 204 may not hop) is whether that particular channel number meets or exceeds the minimum separation. The diagram 300 has an illustrative minimum separation of 2. Thus, for the transceiver 204 to hop from a current channel number to a next channel number, the two consecutive channel numbers must be separated by a minimum of 2 channel numbers. Thus, referring to the diagram 300, a current channel number 4 (on the x-axis) means that the transceiver 204 cannot hop to channel numbers 3, 4 or 5 (denoted by "O" marks along the y-axis), but the transceiver 204 still may hop to channel numbers 0-2 or channel numbers 6-9 (denoted by "X" marks along the y-axis). Similarly, a current channel number 8 (on the x-axis) means that the transceiver 204 cannot hop to channel numbers 7, 8 or 9 (denoted by "O" marks along the y-axis), but the transceiver 204 may hop to channel numbers 0-6 (denoted by "X" marks along the y-axis). Although the diagram 300 is represented in terms of channel numbers, the channel numbers may equivalently be converted to frequencies, as explained above.

As explained above, one facet of the frequency-hopping scheme described herein is that frequency hops must meet a predetermined minimum separation. Another facet of the scheme is that frequency hops should be evenly distributed among a set or reduced set of possible channel numbers. As previously explained, in this way, the frequency-hopping wireless devices become more "friendly" to other wireless devices operating in the same frequency band. For instance, communications between two non-frequency-hopping wireless devices that communicate with each other at a center frequency of X may suffer if the frequency-hopping devices excessively hop to center frequency X. Therefore, ensuring that the frequency-hopping devices hop to center frequency X no more often than they hop to other frequencies mitigates deleterious effects on communications between the two non-frequency-hopping devices. Thus, referring to diagram 300 of FIG. 3, the frequency hopping scheme described herein dictates that, for each channel number (and, therefore, the center frequency represented by each channel number) along the x-axis, the channel numbers marked "X" along the y-axis have an equal to approximately equal chance of being selected as the next channel/center frequency to be used by the transceiver 204. Stated another way, for a given value of the current channel number, each of the channel numbers marked along the y-axis experience an approximately equal or uniform distribution such that each of these channel numbers is selected the same number of times as the next center frequency to which the transceiver 204 will hop.

The novel frequency-hopping scheme is implemented using multiple steps. First, the scheme entails the generation of a random number. In this regard, the logic may act as a random number generator, or, alternatively, some other component of the device 100 may act as a random number generator. At least some embodiments require that the random number that is generated be uniformly distributed over a reduced set of possible channel numbers. The random number may be described as z(k+1), where k is a time index value that is greater than or equal to 0. The reduced set from which the random number is selected may be described as $$\{0, 1, \ldots, N_{reduced}-1\}$$

where $N_{reduced}=N_{ch}-2N_{sep}+1$, and where $N_{reduced}$ is the reduced number of possible channel numbers that may be used at time (k+1), $N_{ch}$ is the total number of channels in the frequency band being used by the logic, and $N_{sep}$ is the minimum separation described above. Thus, in the diagram 300 of FIG. 3, for instance, $N_{ch}$ is 10 and $N_{sep}$ is 2, resulting in a value of $N_{reduced}$ of 7. Therefore, while the original number of possible channel numbers was {0, 1, . . . , 9}, the reduced set from which the random number is selected is defined as {0, 1, . . . , 6}. There are now described multiple techniques whereby a random number from the reduced set {0, 1, . . . , $N_{reduced}-1$} may be obtained.

Figure 4:
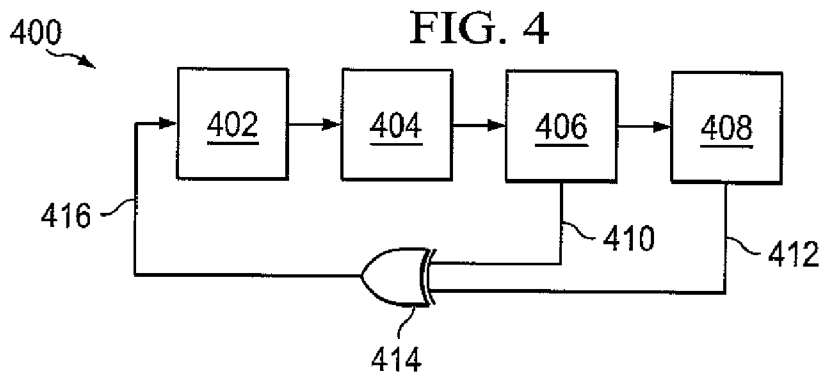
FIG. 4 shows a circuit diagram of an illustrative linear feedback shift register, in accordance with embodiments.

A first technique for generating a random number uniformly distributed over the reduced set is obtained using a linear feedback shift register (LFSR), such as the illustrative LFSR 400 shown in FIG. 4. The LFSR 400 comprises registers 402, 404, 406 and 408, each of which holds one digital bit at a time. At a common time (e.g., as determined by a timer 212 or 214 or clock edge), each bit in these registers shifts to the right. Thus, the bit value in register 402 is shifted to register 404; the bit of register 404 shifts to register 406; the bit of register 406 shifts to register 408; and the bit of register 408 is discarded. The new value input into register 402, however, is generated by logic 414 and provided to the register 402 via connection 416. In some embodiments, the logic 414 comprises an XOR gate. The value output by the logic 414 is based on multiple inputs from the registers. Specifically, in the embodiment shown in FIG. 4, registers 406 and 408 are said to be "tapped" because the bits they contain are input to the logic 414 (via connections 410 and 412) and form the basis for the output of the logic 414. Numerous variations of the LFSR 400 are possible, and every one of these variations is included within the scope of this disclosure. Because the LFSR 400 comprises four registers, the LFSR 400 is said to be a 15-state LFSR (i.e., $2^4=16$ minus one because the zero state, in which the four LFSR bits are 0000, is not used). The output of the LFSR 400 at any given time is the collective set of 4 bits in the registers. Thus, if the registers 402, 404, 406, 408 contain bits 0, 1, 1, and 1, respectively, then the output of the LFSR 400 is 0111 (binary)=7 (decimal). An alternative mapping also is possible, i.e., 0111 (binary)=14 (decimal). There will be no confusion among wireless devices as long as the mapping is pre-defined for both the transmitter and receiver. The LFSR 400 may be included as part of the device 100 shown in FIG. 2 (e.g., as part of the processor 200 or as part of other circuitry coupled to the processor 200).

The logic uses the state of the LFSR 400 to generate a random number z(k+1). In particular, the random number z(k+1) is generated as follows:

$$z(k+1)=[(y(k+1)+k)\bmod N_{reduced}],$$

where z(k+1) is the random number, y(k+1) is a secondary random number that is generated as described below, k is a time index value, and $N_{reduced}$ is—as explained above—the reduced number of total channels within which the generated random number must fall.

The secondary random number y(k+1) is generated using the LFSR 400. The random number y(k+1) is generated by selecting a subset of the shift registers in the LFSR 400. In the case that m registers are selected (or tapped) in the subset of shift registers from LFSR 400, the number y(k+1) falls within a set defined as {0, 1, . . . , M−1}, where $M=2^m$. Further, n—the number of states in the LFSR—is greater than or equal to m. In some embodiments, M is greater than or equal to $N_{reduced}$. This secondary random number y(k+1) is used to calculate z(k+1) using the equation provided above. The random numbers z(k+1) produced for a variety of secondary random numbers y(k+1) will be uniformly or nearly uniformly distributed over {0, 1, . . . , $N_{reduced}-1$}. The seed for the LFSR 400 (i.e., the initial value for the LFSR) determines the sequence pattern for y(k+1), and, thus, the sequence pattern for z(k+1). The LFSR 400 is shown as having four bit values, but in some embodiments, LFSRs having any number of bit values may be used, as described in further detail below with respect to the LFSR 450 shown in FIG. 5. In some embodiments, m is equal to n.

A second technique to generate a random number also involves the use of an LFSR and the generation of a secondary random number y(k+1). The number y(k+1) is selected from a set of random numbers that includes {0, 1, . . . , N−1}. The number y(k+1) is the output of an n-state LFSR, where N is greater than $N_{reduced}$, N is equal to $2^n$, and n is chosen to be sufficiently large (e.g., n is greater than or equal to 16) to ensure that the output z(k+1) is nearly uniformly distributed over the set of possible numbers. The random number z(k+1) is generated according to the equation $$z(k+1)=[y(k+1) \bmod N_{reduced}].$$

As before, the seed (i.e., initial value) of the LFSR determines the sequence pattern for y(k+1) and, thus, for z(k+1).

The LFSR 400 contains only four bits and, therefore, fewer states than would be available if a larger LFSR (with a greater number of bits) is used. To maximize the uniform nature of the distribution of random values over the possible set of random values, in at least some embodiments, the LFSR 400 contains a greater number of bits (e.g., 16 bits, 32 bits, or more), thus making available a greater number of states than would be possible if a 4-bit LFSR were used.

Figure 5:
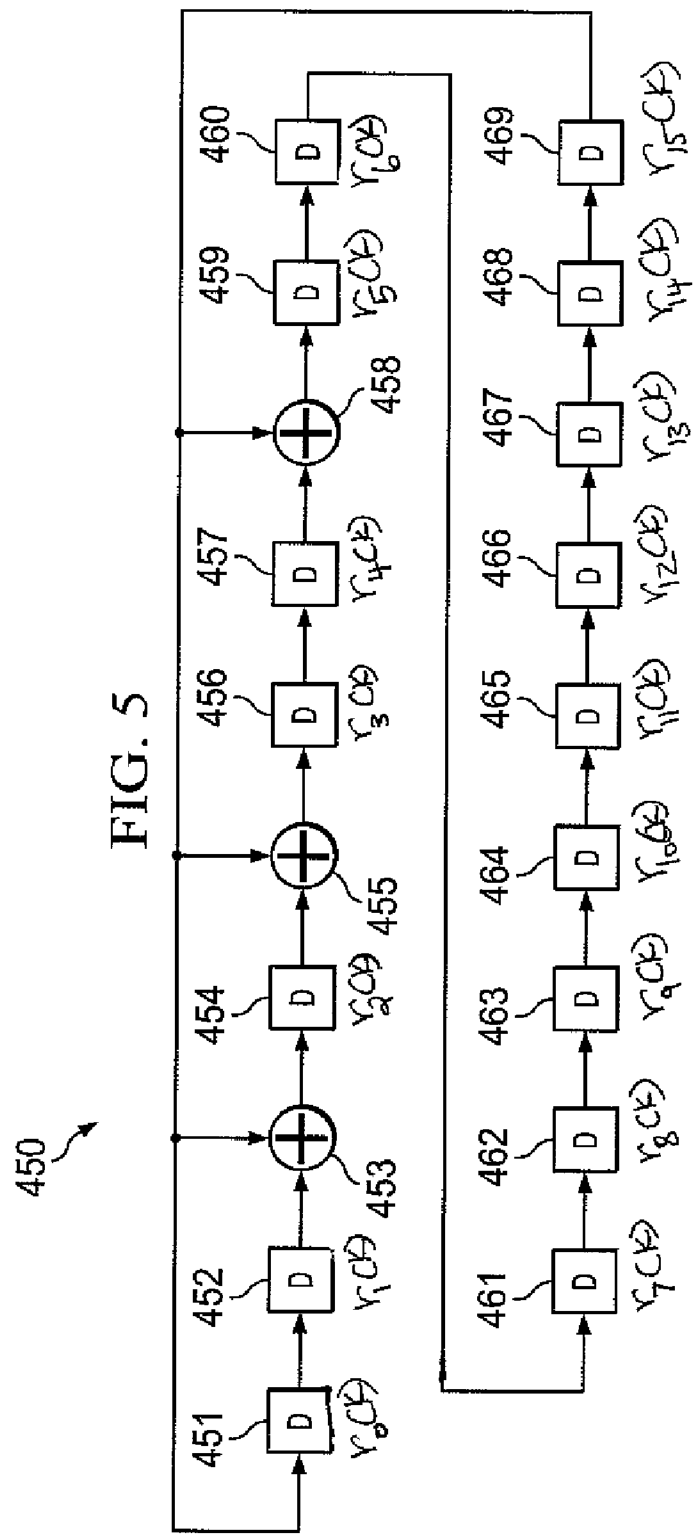
FIG. 5 shows another circuit diagram of another illustrative linear feedback shift register, in accordance with embodiments.

Although LFSR 400 has been described thus far as the LFSR that is used to generate the secondary random number y(k+1), the number y(k+1) also may be generated using the LFSR 450 shown in FIG. 5. In particular, FIG. 5 shows a maximum-length Galois LFSR 450 comprising registers 451-452, 454, 456-457, and 459-469. The LFSR 450 also comprises summation blocks 453, 455 and 458. The digital bits in the registers of LFSR 450 are repeatedly shifted to the right. The bit value of register 469 is provided to the register 451 as well as summation blocks 453, 455 and 458. The secondary random number y(k+1) represents the binary value read from the registers of LFSR 450, with the bit in register 451 being the least significant bit and the bit in register 469 being the most significant bit. The number y(k) at time index value k is given by $y(k)=2^0*r_0(k)+2^1*r_1(k)+ \ldots +2^{15}*r_{15}(k)$. The number y(k+1) is determined from the value of the LFSR at time index (k+1).

A third technique also may be used to generate random numbers. For instance, a Linear Congruential Generator (LCG) (e.g., executable code 206 executed by the logic) may be used. To generate random numbers, the LCG may use the equation $$z(k+1)=[(az(k)+c) \bmod N_{reduced}],$$

where a and c are variable parameters and a starting value z(1) functions as a seed value from which random numbers are generated. The period of a general LCG is at most N, and for some choices of a, the period is less than that. Generally, the LCG will have a full period if and only if the following conditions are satisfied: c and $N_{reduced}$ are relatively prime; a−1 is divisible by all prime factors of $N_{reduced}$; and a−1 is a multiple of 4 if $N_{reduced}$ is a multiple of 4.

Random numbers z(k+1) may be generated using any of the techniques described above, variations of the techniques described above, or different techniques that are not described above. All such random number generation techniques are included within the scope of this disclosure. After a random number z(k+1) is generated, the frequency-hopping scheme comprises using the generated random number z(k+1) to generate a new channel number to which the transceiver 204 should hop. In particular, the new (or "target") channel number to which the transceiver 204 should hop is denoted as $n_c(k+1)$ and is determined using the equation $$n_c(k+1)=[(z(k+1)+n_c(k)+N_{sep}) \bmod N_{ch}] \text{ for } k \geqq 0,$$

where $n_c(0)$ may be any number in the set {0, 1, . . . , $N_{ch}$−1}. Thus, the target channel number is a function of the random number generated as described above, the current channel number, the minimum separation, and the total number of channels in the set. In at least some embodiments, the initial value for the foregoing equation may be set as $n_c(0)=[y(0) \bmod N_{ch}]$. The target channel number can then be mapped to a corresponding center frequency (e.g., by adding a constant).

With either of the above random number generation techniques, the entire sequence of random numbers that is generated depends on the initial value of the LFSR, also known as the "seed" value of the LFSR. In at least some embodiments, the seed value of the LFSR is determined by assigning each bit of the LFSR to the least significant bits of the media access control (MAC) address of the device 100. Thus, for instance, referring to FIG. 5, the least significant bit of the device 100 MAC address is assigned to bit 451, the next least significant bit of the device 100 MAC address is assigned to bit 452, and so on. Further, in some such embodiments, the device 100 selects the channel number $n_c(0)$ of its initial channel according to the equation $$n_c(0)=y(0) \bmod N_{ch}.$$

Because the foregoing techniques are dependent upon the use of a variable k, in at least some embodiments, some or all devices in the system 98 repeatedly transmit signals to other devices in the system 98 to ensure that all devices are using the same k value, thereby ensuring that all devices hop to the same frequencies at the same time. In some embodiments, the value of k may be broadcast using, e.g., a beacon signal.

Figure 6:
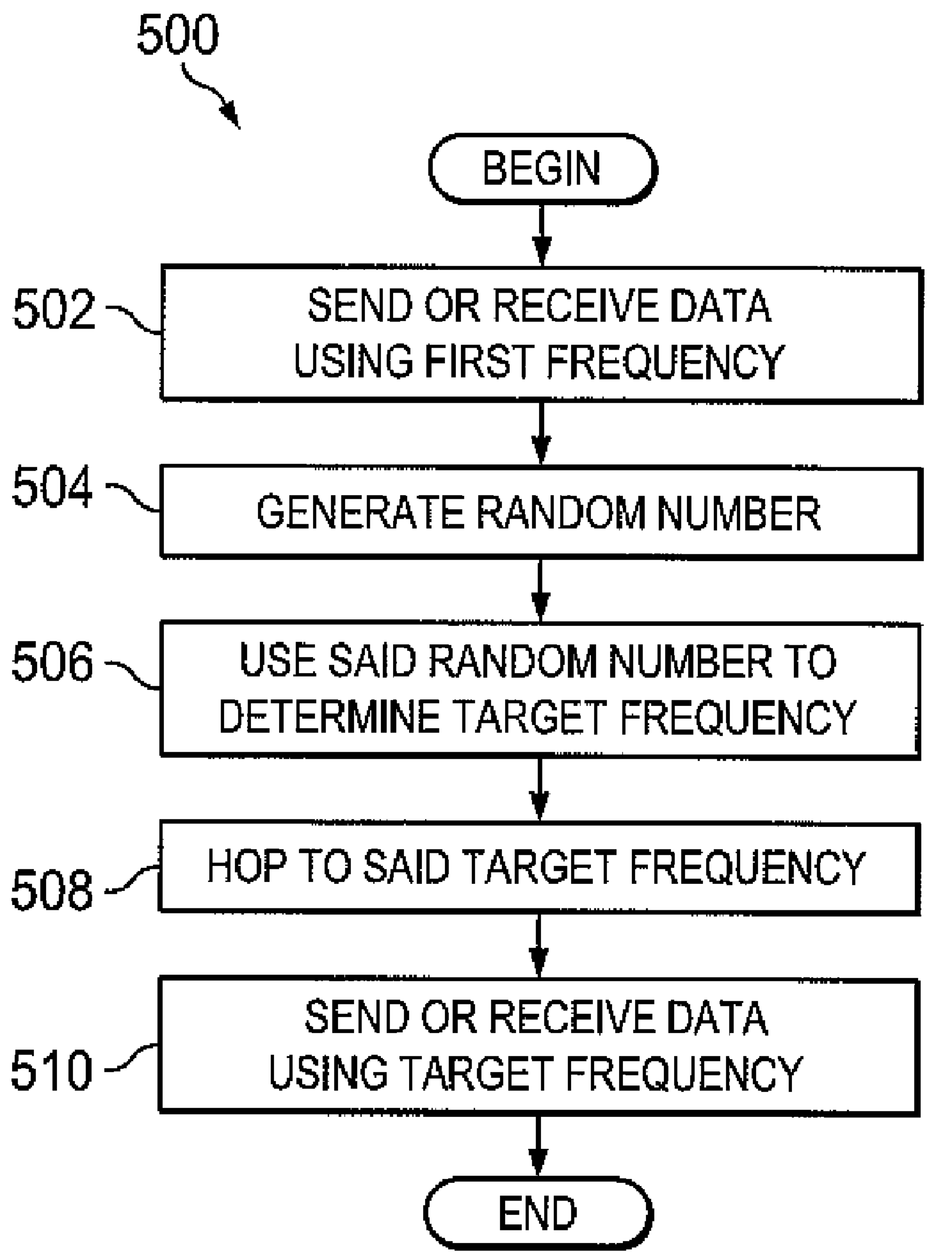
FIG. 6 shows a flow diagram of an illustrative method implemented in accordance with embodiments.

FIG. 6 shows a flow diagram of an illustrative method 500 implemented in accordance with various embodiments. The method 500 begins with the transceiver 204 sending or receiving data using a first center frequency (or channel number) (block 502). The transceiver 204 continues to use that center frequency for a period of time that includes the transmission of multiple beacon signals and beacon periods between those beacon signals. Such beacon signals are transmitted by an access point or hub within the system 98. The device 100 or 104 could act as such an access point or hub, or some other device within the system 98 could act as such an access point or hub. In at least some embodiments, the transceiver 204 does not hop from the first center frequency to a second center frequency in the middle of a beacon period or otherwise within a beacon period. In some embodiments, a device within the system 98 dictates when a center frequency hop should occur (e.g., via a beacon signal, such as by using one or both of the Channel Hopping State or Next Channel Hop fields, which are described in the IEEE 802.15.6 protocol).

In some embodiments, the devices are pre-programmed to change frequencies at specific times. Other techniques for synchronizing frequency hops among some or all devices in the system 98 are contemplated and are included within the scope of this disclosure. In some embodiments, a group of devices synchronized to the same center frequency hopping sequence uses a different hopping sequence than does a neighboring group of devices. Thus, for instance, a device 100, 104 or other device acting as a hub or access point may dictate parameters that cause the devices interacting with the hub/access point to all hop according to the same sequence. At the same time, other devices interacting with each other but not interacting with the devices 100 and 104 all hop according to a different sequence. In this way, communication interference is mitigated.

In some embodiments, a hub (e.g., device 100 or 104) dictates that the devices with which the hub communicates hop frequencies periodically. The hub may dictate that the devices hop frequencies every R beacon periods, where R is an integer. The hub may inform the devices with which it communicates of the value of R using Connection Assignment frames in beacon signals. Connection Assignment frames are described in the IEEE 802.15.6 protocol.

When a frequency hop is to occur, the method 500 includes the logic generating a random number (block 504). As explained above, the logic may generate a random number using either of the multiple above-described techniques or using any other suitable technique. The method 500 then comprises the logic using the random number to determine a target center frequency (or channel number) (block 506). The method 500 subsequently comprises the logic hopping to that target frequency (or channel number) (block 508) and sending or receiving data using that target center frequency (or channel number) (block 510). Steps may be added to the method 500 or removed from the method 500. Steps presently included in the method 500 may be adjusted as desired, including alteration or rearrangement of steps.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of producing a frequency hopping sequence, comprising: generating, by a logic unit, a plurality of multiple random numbers evenly distributed over a range; determining a next frequency in said sequence using said plurality of multiple random numbers; and one or more of a minimum separation, a channel number, and a number of channels; and hopping to said next frequency, wherein said range is determined using the equation Nreduced=Nch−2Nsep+1, wherein Nreduced is the reduced number of possible channel numbers that can be used at a time (k+1), Nch is said number of channels and Nsep is said minimum separation.

2. The method of claim 1, wherein determining the next frequency comprises determining a sum of said random number, said minimum separation, and said channel number.

3. The method of claim 2, wherein determining the next frequency further comprises performing a modulo function with said sum and said number of channels.

4. A method of producing a frequency hopping sequence, comprising: generating, by a logic unit, a plurality of multiple random numbers evenly distributed over a range; determining a next frequency in said sequence using said plurality of multiple random numbers; and one or more of a minimum separation, a channel number, and a number of channels; and hopping to said next frequency, wherein generating said random number comprises using the equation z(k+1)=[(y(k+1)+k)mod Nreduced], where z(k+1) is the random number, y(k+1) is a secondary random number determined using a linear feedback shift register, k is a time index value, and Nreduced comprises Nch−2Nsep+1, wherein Nch comprises said number of channels and Nsep comprises the minimum separation.

5. The method of claim 1, wherein generating said plurality of multiple random numbers comprises performing a modulo function between a random number from said plurality of multiple random numbers and a number of possible channel numbers.

6. A method of producing a frequency hopping sequence, comprising: generating, by a logic unit, a plurality of multiple random numbers evenly distributed over a range; determining a next frequency in said sequence using said plurality of multiple random numbers; and one or more of a minimum separation, a channel number, and a number of channels; and hopping to said next frequency, wherein generating said random number comprises: selecting a secondary random number y(k+1), wherein y(k+1) is among the set {0, 1, . . . , N−1} and comprises an output of an n-state linear feedback shift register, wherein N=2n, wherein N is greater than Nreduced, wherein Nreduced=Nch−2Nsep+1, and wherein Nch is said number of channels and Nsep is said minimum separation; and generating said random number using the secondary random number according to the equation z(k+1)=y(k+1)mod Nreduced.

7. The method of claim 6, wherein generating said random number comprises using a linear congruential generator (LCG).

8. The method of claim 6, wherein generating, determining and hopping comprise generating, determining, and hopping in compliance with the IEEE 802.15.6 protocol.

9. A method, comprising:

sending or receiving data using a center frequency associated with a first channel number;

determining a second channel number, wherein the second channel number is at least a predetermined number of channels away from said first channel number, and wherein the determination of the second channel number is in accordance with a uniform distribution scheme over a set of possible channel numbers, wherein determining the second channel number comprises generating a random number, and wherein generating said random number comprises:

selecting a secondary random number y(k+1), wherein y(k+1) is selected from among the set {0, 1, . . . , N−1}, comprises an output of an n-state linear feedback shift register, wherein $N=2^n$, wherein N is greater than $N_{reduced}$, wherein $N_{reduced}=N_{ch}-2N_{sep}+1$, and wherein $N_{ch}$ is a number of channels and $N_{sep}$ is a minimum separation; and generating said random number using the secondary random number according to the equation $z(k+1)=y(k+1) \bmod N_{reduced}$;

hopping from said center frequency associated with the first channel number to another frequency associated with the second channel number; and sending or receiving data using said another center frequency associated with the second channel number.

10. The method of claim 9, wherein said predetermined number of channels comprises a coherence bandwidth or a fraction of said coherence bandwidth.

11. The method of claim 9, wherein each of the steps of sending or receiving data using the center frequency, determining, hopping, and sending or receiving data using the another center frequency comprises complying with the IEEE 802.15.6 protocol.

12. A system, comprising:

logic; and communication logic coupled to the logic;

wherein the logic causes the communication logic to hop among multiple center frequencies and further causes the communication logic to transmit or receive data using said multiple center frequencies;

wherein, with each hop, the logic selects a target center frequency that is separated from a previous center frequency by at least a minimum separation;

wherein the logic determines the target center frequency using a random number, and wherein the logic determines the random number using the equation $z(k+1)=[(y(k+1)+k) \bmod N_{reduced}]$, where z(k+1) is the random number, y(k+1) is a secondary random number determined using a linear feedback shift resister, k is a time index value, and $N_{reduced}$ comprises $N_{ch}-2N_{sep}+1$, wherein $N_{ch}$ comprises a number of channels and $N_{sep}$ comprises a minimum separation.

13. The system of claim 12, wherein said minimum separation comprises a coherence bandwidth or a fraction of said coherence bandwidth.

14. A system, comprising:

logic; and communication logic coupled to the logic;

wherein the logic causes the communication logic to hog among multiple center frequencies and further causes the communication logic to transmit or receive data using said multiple center frequencies;

wherein, with each hop, the logic selects a target center frequency that is separated from a previous center frequency by at least a minimum separation, wherein the logic determines the target center frequency using a random number, and wherein, to generate the random number, the logic:

selects a secondary random number y(k+1), wherein y(k+1) is selected from among the set {0, 1, . . . , N−1} and comprises an output of an n-state linear feedback shift register, wherein $N=2^n$, wherein N is greater than $N_{reduced}$, and $N_{reduced}=N_{ch}-2N_{sep}+1$, and wherein $N_{ch}$ is a number of channels and $N_{sep}$ is a minimum separation; and generates said random number using the secondary random number according to the equation $z(k+1)=y(k+1) \bmod N_{reduced}$.

15. The system of claim 14, wherein the system comprises a network hub.

16. The system of claim 14, wherein the communication logic operates in compliance with the IEEE 802.15.6 protocol.

* * * * *